US012733641B2

(12) United States Patent
Miura et al.

(10) Patent No.: US 12,733,641 B2
(45) Date of Patent: Sep. 15, 2026

(54) CELL DEATH INHIBITOR AND CELL DEATH INHIBITION METHOD

(71) Applicant: UNIVERSITY OF TSUKUBA, Tsukuba (JP)

(72) Inventors: Kenji Miura, Tsukuba (JP); Fuminori Tsuruta, Tsukuba (JP)

(73) Assignee: UNIVERSITY OF TSUKUBA, Tsukuba (JP)

( * ) Notice: Subject to any disclaimer, the term of this patent is extended or adjusted under 35 U.S.C. 154(b) by 1282 days.

(21) Appl. No.: 17/627,410

(22) PCT Filed: Jul. 29, 2020

(86) PCT No.: PCT/JP2020/028981
§ 371 (c)(1),
(2) Date: Jan. 14, 2022

(87) PCT Pub. No.: WO2021/020421
PCT Pub. Date: Feb. 4, 2021

(65) Prior Publication Data

US 2022/0256847 A1 Aug. 18, 2022

(30) Foreign Application Priority Data

Aug. 1, 2019 (JP) ................................ 2019-142038

(51) Int. Cl.
*A01N 43/08* (2006.01)
*A01P 21/00* (2006.01)

(52) U.S. Cl.
CPC .............. *A01N 43/08* (2013.01); *A01P 21/00* (2021.08)

(58) Field of Classification Search
CPC ...................................................... A01P 21/00
See application file for complete search history.

(56) References Cited

U.S. PATENT DOCUMENTS

2021/0108218 A1 4/2021 Miura et al.

FOREIGN PATENT DOCUMENTS

| | | | |
|---|---|---|---|
| JP | 2003009692 | A | 1/2003 |
| JP | 2016526897 | A | 9/2016 |
| WO | 0144459 | A2 | 6/2001 |
| WO | 2015011604 | A1 | 1/2015 |
| WO | 2018220929 | A1 | 12/2018 |

OTHER PUBLICATIONS

Heinrich et al (Review. Nitric oxide—A versatile key player in cochlear function and hearing disorders. Nitric Oxide 27, 106-116, 2012) (Year: 2012).*

Joy IV et al (Ascorbic acid enhancement of organogenesis in tobacco callus. Plant Cell, Tissue and Organ Culture, 13: 219-228, 1988). (Year: 1988).*

Bybordi et al (Effects of Ascorbic Acid and Silicium on Photosynthesis, Antioxidant Enzyme Activity, and Fatty Acid Contents in Canola Exposure to Salt Stress. Journal of Integrative Agriculture, 11(10): 1610-1620, 2012). (Year: 2012).*

Ndakidemi et al (Effects of Ascorbic Acid in Controlling Lethal Browning in in Vitro Culture of Brahylaena huillensis Using Nodal Segments. American Journal of Plant Sciences, 187-191, 2014). (Year: 2014).*

Nosaki at al (Prevention of necrosis caused by transient expression in Nicotiana benthamiana by application of ascorbic acid. Plant Physiology. p. 832-835, 2021) (Year: 2021).*

Toth et al (Concentration Does Matter: The Beneficial and Potentially Harmful Effects of Ascorbate in Humans and Plants. Antioxidants & Redox Signaling. p. 1516-1533, 2018) (Year: 2018).*

Castro et al (Ascorbic acid toxicity is related to oxidative stress and enhanced by high light and knockdown of chloroplast ascorbate peroxidases in rice plants. Theor. Exp. Plant Physiol. p. 41-55, 2018) (Year: 2018).*

Akram et al (Ascorbic Acid-A Potential Oxidant Scavenger and Its Role in Plant Development and Abiotic Stress Tolerance. Frontiers in Plant Science, p. 1-17, 2017) (Year: 2017).*

Norkunas et al (Improving agroinfiltration-based transient gene expression in Nicotiana benthamiana. Plant Methods, p. 1-14, 2018) ( Year: 2018).*

Julia Pinkhasov et al., "Recombinant plant-expressed tumour-associated MUC1 peptide is immunogenic and capable of breaking tolerance in MUC1.Tg mice", Plant Biotechnology Journal (2011) 9, pp. 991-1001.

Misra, P. et al., "Effect of antioxidants and associate changes in antioxidant enzymes in controlling browning and necrosis of proliferating shoots of elite *Jatropha curcas* L", Biomass and Bioenergy, 2010, vol. 34, pp. 1861-1869.

Sharma, R. et al., "Oxidative stress mitigation and initiation of antioxidant and osmoprotectant responses mediated by ascorbic acid in *Brassica juncea* L. subjected to copper (II) stress", Ecotoxicol. Environ. Saf., Jul. 17, 2019, vol. 182:109436.

Aziz, A. et al., "Influence of natural and synthetic vitamin C (ascorbic acid) on primary and secondary metabolites and associated metabolism in quinoa (Chenopodium quinoa Willd.) plants under water deficit regimes", Plant Physiol. Biochem., 2018, vol. 123, pp. 192-203.

Pavet, V. et al., "Ascorbic acid deficiency activates cell death and disease resistance responses in Arabidopsis", Plant Physiol., 2005, vol. 139, pp. 1291-1303.

Miura Kenji, "Efficient transient protein expression in plants, 'Tsukuba system'", Regulation of plant Growth & Development, May 31, 2019, vol. 54, No. 1, pp. 77-81.

Miura Kenji et al., "Development of a high-yield production system for recombinant proteins in plants", Bioscience & Industry, 2018, vol. 76, No.5, pp. 382-385 (No English translation submitted. See the attached IDS Transmittal item No. 3 for relevancy).

(Continued)

*Primary Examiner* — Wayne Zhong
(74) *Attorney, Agent, or Firm* — Leason Ellis LLP; Jordan Garner; Mitsuhiro Haraguchi

(57) ABSTRACT

An inhibitor of cell death induced by transient protein expression in a plant, the inhibitor including, as an active ingredient, ascorbic acid or a derivative thereof, a salt thereof, or a solvate thereof, can advantageously inhibit cell death induced by transient protein expression in a plant.

3 Claims, 11 Drawing Sheets

Specification includes a Sequence Listing.

(56) References Cited

OTHER PUBLICATIONS

Internaional Search Report mailed Oct. 6, 2020 for the corresponding PCT International Patent Application No. PCT/JP2020/028981.

Zhao Huimin et al. "An Improved Syringe Agroinfiltration Protocol to Enhance Transformation Efficiency by Combinative Use of 5-Azacytidine, Ascorbate Acid and Tween-20", Plants, Feb. 14, 2017, p. 9, vol. 6, No. 4, XP93062248, DOI: 10.3390/plants6010009 (10 pages).

Khanna H K et al., "Agrobacterium tumefaciens-mediated transformation of wheat using a superbinary vector and a polyamine-supplemented regeneration medium", Plant Cell Reports, Springer Berlin Heidelberg, Berlin/Heidelberg, Jan. 1, 2003, pp. 429-436, vol. 21, XP002982472, ISSN: 0721-7714 (8 pages).

Mitic Nevena et al., "The procedure providing Enhanced Agrobacterium-mediated transformation of wheat", Biologia, Springer, DE, Jan. 6, 2015, pp. 1668-1677, vol. 69, No. 12, XP035420908, ISSN: 0006-3088, DOI: 10.2478/S11756-014-0477-2 (10 pages).

European Search Report mailed Jul. 24, 2023 for the corresponding European Patent Application No. 20847011.2 (8 pages).

* cited by examiner

FIG. 12
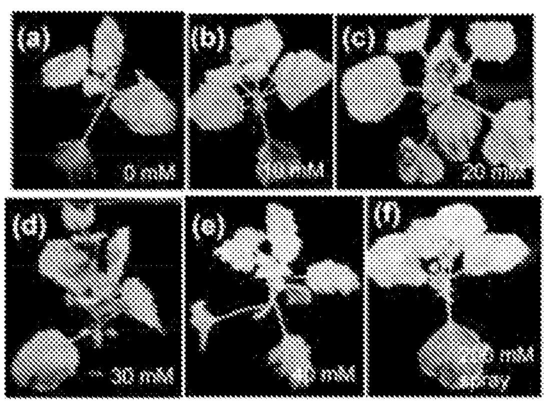
FIG. 13A
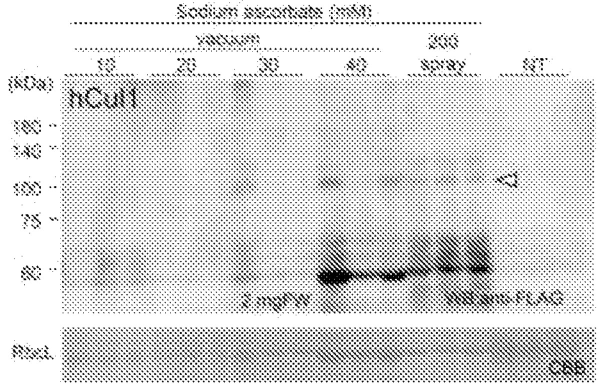
FIG. 13B

FIG. 14
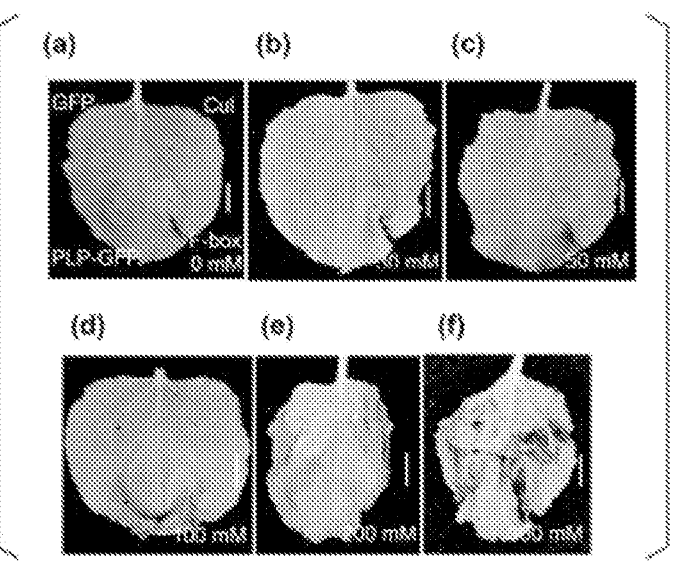
FIG. 15A
FIG. 15B
2000
1500
1000
500
0
0
30
50
100
Sodium citrate (mM)

CELL DEATH INHIBITOR AND CELL DEATH INHIBITION METHOD

The instant application contains a Sequence Listing which has been submitted electronically in ASCII format and is hereby incorporated by reference in its entirety. Said ASCII copy, created on Jan. 11, 2022, is named Sequence_Listing_10299.txt and is 9,590 bytes in size.

CROSS-REFERENCE TO RELATED PATENT APPLICATIONS

This application is a U.S. National Phase application under 35 U.S.C. § 371 of International Patent Application No. PCT/JP2020/028981 filed on Jul. 29, 2020 and claims the benefit of priority to Japanese Patent Application No. 2019-142038 filed on Aug. 1, 2019, the contents of both of which are incorporated herein by reference in their entireties. The International Application was published in Japanese on Feb. 4, 2021 as International Publication No. WO/2021/020421 under PCT Article 21(2).

FIELD OF THE INVENTION

The present invention relates to a cell death inhibitor and a cell death inhibition method. More specifically, the present invention relates to an inhibitor of cell death induced by transient protein expression in a plant and a method for inhibiting cell death induced by transient protein expression in a plant.

BACKGROUND OF THE INVENTION

Studies on the expression of a large amount of a target protein in plant cells have been widely conducted. For example, as a technique for transiently expressing a large amount of a target protein, the inventors have previously developed an expression system including: a first nucleic acid fragment containing a long intergenic region (LIR) derived from a geminivirus, a small intergenic region (SIR) derived from a geminivirus, and an expression cassette of a target protein linked between the LIR and the SIR; and a second nucleic acid fragment containing an expression cassette of a Rep/RepA protein derived from a geminivirus, in which the expression cassette of the target protein includes a promoter, a nucleic acid fragment encoding the target protein, and two or more linked terminators in this order (refer to Patent Literature 1).

However, it is known that, when a large amount of target protein is transiently expressed in plant cells, cell death (necrosis, gangrene) of plant cells is induced and the expressed target protein is degraded (for example, Non-Patent Literature 1).

CITATION LIST

Patent Literature

Patent Literature 1: WO 2018/220929

Non-Patent Literature

[Non-Patent Literature 1] Pinkhasov J., et al., Recombinant plant-expressed tumour-associated MUC1 peptide is immunogenic and capable of breaking tolerance in MUC1. Tg mice, Plant Biotechnology Journal, 9, 991-1001, 2011.

Problems to be Solved

An object of the present invention is to provide a technique for inhibiting cell death induced by transient protein expression in a plant.

SUMMARY OF THE INVENTION

Solution for Solving the Problems

The present invention includes the following aspects.

[1] An inhibitor of cell death induced by transient protein expression in a plant, the inhibitor including, as an active ingredient, ascorbic acid or a derivative thereof, a salt thereof, or a solvate thereof.

[2] The inhibitor according to [1], in which the inhibitor is used by bringing from 100 to 300 mM ascorbic acid or a derivative thereof, a salt thereof, or a solvate thereof into contact with the plant.

[3] The inhibitor according to [1], in which the inhibitor is used by adding 25 to 80 mM ascorbic acid or a derivative thereof, a salt thereof, or a solvate thereof to an *Agrobacterium* suspension for introducing an expression vector of a target protein to the plant or to a culture solution for hydrocultivating the plant.

[4] The inhibitor according to any one of [1] to [3], in which the plant is of the genus *Nicotiana*.

[5] A method for inhibiting cell death induced by transient protein expression in a plant, the method including: administering ascorbic acid or a derivative thereof, a salt thereof, or a solvate thereof to the plant.

[6] The method according to [5], in which administering includes bringing from 100 to 300 mM ascorbic acid or a derivative thereof, a salt thereof, or a solvate thereof into contact with the plant.

[7] The method according to [5], in which administering includes adding from 25 to 80 mM ascorbic acid or a derivative thereof, a salt thereof, or a solvate thereof to an *Agrobacterium* suspension for introducing an expression vector of a target protein to be administered to the plant, or to a culture solution for hydrocultivating the plant.

[8] The method according to any one of [5] to [7], in which the plant is of the genus *Nicotiana*.

Effects of the Invention

According to the present invention, a technique for inhibiting cell death induced by transient protein expression in a plant can be provided.

BRIEF DESCRIPTION OF THE DRAWINGS

FIG. 12 shows representative photographs obtained by photographing each of the plants in Example 4.

FIG. 13A is a photograph showing the results of Western blotting for hCu1 protein detection in Example 4. FIG. 13B is a graph showing the results of an expression level quantification of the hCu1 protein based on FIG. 13A.

FIG. 14 shows representative photographs obtained by photographing leaves of each plant in Example 5.

FIG. 15A is a photograph showing the results of CBB staining in Example 5. FIG. 15B is a graph showing the results of an expression level quantification of a GFP protein based on FIG. 15A.

DETAILED DESCRIPTION OF THE INVENTION

Figure 1:
FIG. 1 is a schematic diagram of a T-DNA region of a pBYR2HS-EGFP vector.

Inhibitor of Cell Death Induced by Transient Protein Expression in Plant

In one embodiment, the present invention provides an inhibitor of cell death induced by transient protein expression in a plant, the inhibitor including, as an active ingredient, ascorbic acid or a derivative thereof, a salt thereof, or a solvate thereof.

As described below in Examples, the inhibitor of the present embodiment can inhibit cell death (necrosis, gangrene) induced by transient protein expression in a plant. Further, as described below in Examples, inhibition of cell death of the plant by administration of the inhibitor of the present embodiment enables production of a large amount of target protein.

The inhibitor of the present embodiment may be ascorbic acid, may be an ascorbic acid derivative, may be a salt of ascorbic acid, may be a salt of an ascorbic acid derivative, may be a solvate of ascorbic acid, may be a solvate of an ascorbic acid derivative, may be a solvate of a salt of ascorbic acid, or may be a solvate of a salt of an ascorbic acid derivative.

Ascorbic acid is one type of organic compound with a lactone structure, which functions as a nutrient vitamin C Ascorbic acid is an optically active compound and ascorbic acid known as Vitamin C is in an L form. In the present embodiment, the ascorbic acid may be in an L form or may be in a D form, but the L form is preferable.

Examples of ascorbic acid derivatives include ascorbyl alkyl esters, ascorbic acid phosphate esters, ascorbyl glucosides, and ascorbic acid alkyl ethers. More specific examples of ascorbic acid derivatives include: ascorbyl alkyl esters such as ascorbyl monostearate, ascorbyl monopalmitate, ascorbyl monoisopalmitate, ascorbyl monooleate, ascorbyl distearate, ascorbyl dipalmitate, ascorbyl monopalmitate, and ascorbyl tetrahexyldecanoate; ascorbic acid phosphate esters such as ascorbic acid monophosphate ester, ascorbic acid diphosphate ester, and ascorbic acid triphosphate ester; ascorbyl monoglucosides such as ethyl ether ascorbic acid and methyl ether ascorbic acid; and ascorbyl glucosides such as ascorbyl diglucoside. In addition to this, examples thereof include ascorbyl palmitate phosphate, which is an ascorbic acid alkyl ester and ascorbic acid phosphate ester. In addition, these ascorbic acid derivatives may have a structure in which at least one of the hydroxyl groups at the 6th, 2nd, 3rd, and 5th positions in ascorbic acid is substituted.

The salts of ascorbic acid or ascorbic acid derivative are not particularly limited, and examples thereof include salts of ascorbic acid or ascorbic acid derivatives and alkali metals (for example, sodium or potassium), salts of ascorbic acid or ascorbic acid derivatives and alkaline earth metals (for example, calcium or magnesium), salts of ascorbic acid or ascorbic acid derivatives and transition metals (for example, zinc, iron, cobalt, or copper), salts of ascorbic acid or ascorbic acid derivatives and basic ammonium, salts of ascorbic acid or ascorbic acid derivatives and triethanolamine, and salts of ascorbic acid or ascorbic acid derivatives and amino acids (for example, L-histidine, L-arginine, or L-lysine). Among these, for example, sodium ascorbate, potassium ascorbate, calcium ascorbate, magnesium ascorbate, sodium ascorbyl phosphate, magnesium ascorbyl phosphate, and the like can be suitably used.

Examples of the ascorbic acid or the derivatives thereof, the salts thereof, or the solvates thereof include hydrates and organic solvates, and more specifically, examples thereof include sodium isoascorbate monohydrate and calcium ascorbate dihydrate.

As the inhibitor of the present embodiment, one type of ascorbic acid or a derivative thereof, a salt thereof, and a solvate thereof may be used alone, or a plurality of types thereof may be used in a mixed manner.

Administering the inhibitor of the present embodiment may include bringing the inhibitor into contact with a plant at a concentration from 100 to 300 mM. Here, bringing the inhibitor into contact with a plant may include spraying a liquid, in which ascorbic acid or a derivative thereof, a salt thereof, or a solvate thereof is dissolved or suspended, onto a part of the plant that has induced transient protein expression, for example, leaves. Alternatively, administering includes immersing the plant that has induced transient protein expression in the above-described liquid.

In the liquid in which the inhibitor of the present embodiment is dissolved or suspended, examples of the solvent include water, a buffer solution, and an isotonic solution.

In the liquid in which the inhibitor of the present embodiment is dissolved or suspended, the lower limit of the concentration of ascorbic acid or a derivative thereof, a salt thereof, or a solvate thereof may be, for example, 80 mM, 100 mM, 150 mM, 200 mM, or 250 mM. Further, in the liquid in which the inhibitor of the present embodiment is dissolved or suspended, the upper limit of the concentration of ascorbic acid or a derivative thereof, a salt thereof, or a solvate thereof may be, for example, 300 mM, 250 mM, 200 mM, 150 mM, or 100 mM. These lower and upper limits can be combined in any manner When spraying the inhibitor of the present embodiment, examples of the spray schedule includes once a day, once every two days, once every three days, and once every four days.

Administering the inhibitor of the present embodiment may include adding the inhibitor at a concentration from 25 to 80 mM to an *Agrobacterium* suspension for introducing an expression vector of a target protein to the plant, and by using the *Agrobacterium* suspension (agroinfiltration liquid), administering the inhibitor to the plant by performing agroinfiltration in which a syringe is used or by performing vacuum infiltration. In other words, when the expression construct of the target protein is introduced into the plant, the inhibitor of the present embodiment may be administered at the same time. Alternatively, administering the inhibitor of the present embodiment may include adding the inhibitor to a culture solution for hydrocultivating a plant at a concentration from 25 to 80 mM.

As described below in Examples, in a case where the inhibitor of the present embodiment is added to the *Agrobacterium* suspension, the optimum concentration tends to be different from the case where the inhibitor of the present embodiment is brought into contact with the plant. In addition, in a case where the inhibitor of the present embodiment is added to the culture solution for hydrocultivation, the concentration is preferably the same as the case where the inhibitor is added to the *Agrobacterium* suspension.

More specifically, in the *Agrobacterium* suspension or the culture solution for hydrocultivation, the lower limit of the concentration of ascorbic acid or a derivative thereof, a salt thereof, or a solvate thereof may be, for example, 25 mM, 30 mM, 40 mM, 50 mM, or 60 mM. Further, in the *Agrobacterium* suspension or the culture solution for hydrocultivation, the upper limit of the concentration of ascorbic acid or a derivative thereof, a salt thereof, or a solvate thereof may be, for example, 80 mM, 60 mM, 50 mM, 40 mM, or 30 mM. These lower and upper limits can be combined in any manner In a case where the inhibitor of the present embodiment is added to the *Agrobacterium* suspension, only one administration of the inhibitor of the present embodiment is performed during agroinfiltration.

Administration of the inhibitor of the present embodiment may be performed by any one of: administration in a contact manner; administration by the *Agrobacterium* suspension to which the inhibitor is added; and administration by the culture solution for hydrocultivating the plant, where the inhibitor is added to the culture solution, or by two or more of these in any combination.

In the present specification, cell death induced by transient protein expression in a plant means cell death induced when a large amount of target protein is transiently (temporarily) expressed in plant cells.

Means for transient protein expression is not particularly limited, but examples thereof include a method of utilizing *Agrobacterium* and T-DNA. T-DNA is a specific region of Ti plasmid and Ri plasmid found in pathogenic strains of *Agrobacterium*, which is a pathogenic bacterium of crown gall, which is a tumor of a dicotyledon. T-DNA is a DNA region sandwiched by approximately 25 base sequences called Right Border (RB) and Left Border (LB). When *Agrobacterium* with T-DNA coexists with plant cells, the nucleic acid fragment present between RB and LB is transferred into the host plant cells.

Therefore, by introducing into the *Agrobacterium* a vector that has introduced the expression construct of the target protein between RB and LB, and by introducing the *Agrobacterium* into the host plant, the expression construct of the target protein can be easily introduced into the host plant cells.

The vector in which the expression construct of the target protein exists between RB and LB is preferably a vector that can be used for a binary vector method. The binary vector method is a method of introducing genes into the plant using vir helper Ti plasmid from which the original T-DNA of the Ti plasmid is removed and a small shuttle vector with artificial T-DNA. Here, it is preferable that the shuttle vector be capable of being maintained by both *E. coli* and *Agrobacterium.* vir helper Ti plasmid does not have the original T-DNA and therefore cannot form crown gall in a plant. However, vir helper Ti plasmid has a vir region required to introduce T-DNA into the host plant cells.

Therefore, by introducing the T-DNA having a desired nucleic acid fragment into the *Agrobacterium* having the vir helper Ti plasmid, and by introducing the *Agrobacterium* into the host plant, the desired nucleic acid fragment can be easily introduced into the host plant cells.

In other words, a vector in which the expression construct of the target protein exists between RB and LB is convenient when the vector is a shuttle vector that has a replication point for *E. coli* and a replication point for *Agrobacterium*, and can be maintained by both *E. coli* and *Agrobacterium.*

In the inhibitor of the present embodiment, means for transiently expressing the protein is not particularly limited, and examples thereof include: a method of introducing to a plant an expression system, which has been previously developed by the inventors, the expression system including: a first nucleic acid fragment containing an LIR derived from geminivirus, an SIR derived from geminivirus, and an expression cassette of a target protein linked between the LIR and the SIR; and a second nucleic acid fragment containing an expression cassette of a Rep/RepA protein derived from geminivirus, in which the expression cassette of the target protein includes a promoter, a nucleic acid fragment encoding the target protein, and two or more linked terminators in this order; and a method of introducing a commercial expression system based on tobacco mosaic virus into a plant, which is called the magnICON system.

In the inhibitor of the present embodiment, the plant is not particularly limited, and examples thereof include Solanaceae plants such as tomato, eggplant, and red pepper; Asteraceae plants such as lettuce; Cucurbitaceae plants such as melon; and Orchidaceae plants such as moth orchid. Among these, Solanaceae plants are preferable, and plants of the genus *Nicotiana* are preferable. More specific examples of the plant of the genus *Nicotiana* genus include *Nicotiana benthamiana*, tobacco, and *Nicotiana alata.*

Method for Inhibiting Cell Death Induced by Transient Protein Expression in Plant In one embodiment, the present invention provides a method for inhibiting cell death induced by transient protein expression in a plant, the method including: administering ascorbic acid or a derivative thereof, a salt thereof, or a solvate thereof to the plant.

As described below in Examples, by the method of the present embodiment, it is possible to inhibit cell death (necrosis, gangrene) induced by transient protein expression in a plant. Further, by inhibiting cell death of the plant, it is possible to produce a large amount of target protein.

Administering ascorbic acid or a derivative thereof, a salt thereof, or a solvate thereof may include bringing from 100 to 300 mM ascorbic acid or a derivative thereof, a salt thereof, or a solvate thereof into contact with the plant.

Here, similar to the description above, bringing the inhibitor into contact with a plant may include spraying a liquid, in which ascorbic acid or a derivative thereof, a salt thereof, or a solvate thereof is dissolved or suspended, onto a part of the plant that has induced transient protein expression, for example, leaves. Alternatively, administering includes immersing the plant that has induced transient protein expression in the above-described liquid. The concentration of ascorbic acid or a derivative thereof, a salt thereof, or a solvate thereof in the liquid in which ascorbic acid or a derivative thereof, a salt thereof, or a solvate thereof is dissolved or suspended are similar to those described above.

Administering ascorbic acid or a derivative thereof, a salt thereof, or a solvate thereof may include adding from 25 to 80 mM ascorbic acid or a derivative thereof, a salt thereof, or a solvate thereof to an *Agrobacterium* suspension for introducing an expression vector of a target protein to be administered to the plant, or to a culture solution for hydrocultivating the plant.

Here, the *Agrobacterium* suspension, the culture solution for hydrocultivation, and the concentration of ascorbic acid or a derivative thereof, a salt thereof, or a solvate thereof are similar to those described above.

In the method of the present embodiment, the plant is similar to those described above, and examples thereof include Solanaceae plants such as tomato, eggplant, and red pepper; Asteraceae plants such as lettuce; Cucurbitaceae plants such as melon; and Orchidaceae plants such as moth orchid. Among these, Solanaceae plants are preferable, and the *Nicotiana* plants are preferable. More specific examples of the plant of the genus *Nicotiana* genus include *Nicotiana benthamiana*, tobacco, and *Nicotiana alata.*

Other Embodiments

Ascorbic acid or a derivative thereof, a salt thereof, or a solvate thereof, which is used to inhibit cell death induced by transient protein expression in a plant.

The use of ascorbic acid or a derivative thereof, a salt thereof, or a solvate thereof for inhibiting cell death induced by transient protein expression in a plant.

The use of ascorbic acid or a derivative thereof, a salt thereof, or a solvate thereof for producing an inhibitor of cell death induced by transient protein expression in a plant.

EXAMPLES

Hereinafter, the present invention will be described in further detail with reference to examples, but the present invention is not limited to the following examples.

Materials and Methods

Production of Vectors

Production of pBYR2HS-EGFP Vector pBYR2fp vector is a known vector having a replication system derived from a bean yellow dwarf virus (BeYDV). The pBYR2fp vector also contains an expression cassette of a gene-silencing inhibitor P19 derived from the tomato bushy stunt virus.

The pBYR2fp vector was introduced with an EGFP gene fragment with 5'-UTR (hereinafter, also referred to as "AtADH5'") of an alcohol dehydrogenase gene and a terminator (hereinafter, also referred to as "HSPter") of an *arabidopsis* heat shock protein 18.2 gene.

Specifically, the EGFP gene fragment was first PCR amplified by using a primer (pRI201-EGFP-F, base sequence is shown in SEQ ID NO: 1) and a primer (EGFP-pRI201-R, base sequence is shown in SEQ ID NO: 2).

The obtained PCR product was then cloned into pRI201-AN (TAKARA BIO INC.) cut by the restriction enzyme NdeI and SalI to produce the pRI201-EGFP vector.

Then, while the pRI201-EGFP vector was used as a template, the EGFP gene fragment with 5'-UTR of an alcohol dehydrogenase gene and a terminator of the *arabidopsis* heat shock protein 18.2 gene was PCR amplified by using a primer (pBYR2fp-AtADH-F, base sequence is shown in SEQ ID NO: 3) and a primer (pBYR2fp-HSPter-R, base sequence is shown in SEQ ID NO: 4).

The obtained PCR product was then cloned into the pBYR2fp vector cut by the restriction enzymes XhoI and XbaI to obtain the pBYR2HS-EGFP vector. FIG. 1 is a schematic view of a T-DNA region of the pBYR2HS-EGFP vector. In FIG. 1, "35S-px2" means a 35S promoter of a cauliflower mosaic virus (CaMV) having two Enhance Elements, "AtADH5'" means 5'-UTR of the *arabidopsis* alcohol dehydrogenase gene, "EGFP" means enhanced green fluorescence protein, "Ext3'" means the terminator of the tobacco extensin gene, "HSPter" means the terminator of the *arabidopsis* heat shock protein 18.2 gene, "LIR" means Long Intergenic Region of the bean yellow dwarf virus (BeYDV) genome, "SIR" means Short Intergenic Region of the BeYDV genome, "C1" and "C2" mean open reading frames C1 and C2 encoding the Rep/RepA protein, which is a replication initiation protein of the BeYDV, "LB" and "RB" mean a left border sequence and a right border sequence of T-DNA, respectively, "Nos-p" means an NOS promoter, "p19" means the gene encoding the gene-silencing inhibitor P19 derived from the tomato bushy stunt virus, and "Nos-t" means an NOS terminator.

Production of pBYR2HS Vector

For simplicity, the EGFP gene fragment was removed from the pBYR2HS-EGFP vector, and a pBYR2HS vector in which the restriction enzyme SalI site was introduced between AtADH5' and HSPter was produced. Cutting the pBYR2HS vector with the restriction enzyme SalI allowed the target gene to be introduced between the AtADH5' and the HSPter of the pBYR2HS vector.

Production of pBYR2HS-HF-hCu1 Vector

A gene fragment (base sequence is shown in SEQ ID NO: 5) encoding human Cullin 1 protein (hereinafter, also referred to as "hCu1"), which was optimized for the codon of *Nicotiana benthamiana*, was chemically synthesized (Thermo Fisher Scientific Co., Ltd.). A 6× histidine tag and a FLAG tag were linked to the N-terminus side of the synthesized gene fragment, and KDEL (SEQ ID NO: 6), which is the endoplasmic reticulum signal, was linked to the C-terminus side.

The hCu1 gene fragment was then PCR amplified by using a primer (pBYR2HS-Hisx6-F, base sequence is shown in SEQ ID NO: 7) and a primer (pBYR2HS-KDEL-R, base sequence is shown in SEQ ID NO: 8). The hCu1 gene fragment was then introduced into the pBYR2HS vector cut by the restriction enzyme SalI to obtain the pBYR2HS-HF-hCu11 vector.

Production of pBYR2HS-HF-hFbxw7 Vector

A gene fragment (base sequence is shown in SEQ ID NO: 9) encoding an Fbxw7 protein (hereinafter, also referred to as "hFbxw7"), which is a human F-box protein optimized for the codon of *Nicotiana benthamiana*, was chemically synthesized (Thermo Fisher Scientific Co., Ltd.). A 6× histidine tag and a FLAG tag were linked to the N-terminus side of the synthesized gene fragment, and the KDEL (SEQ ID NO: 6), which is the endoplasmic reticulum signal, was linked to the C-terminus side.

The hFbxw7 gene fragment was then PCR amplified by using a primer (pBYR2HS-Hisx6-F, SEQ ID NO: 7) and a primer (pBYR2HS-KDEL-R, SEQ ID NO: 8). The hFbxw7 gene fragment was then introduced into the pBYR2HS vector cut by the restriction enzyme SalI to obtain the pBYR2HS-HF-hFbxw7 vector.

Production of pBYR2HS-CEGFP Vector

The EGFP gene fragment was then PCR amplified by using a primer (pBYR2HS-CEGFP-F, base sequence is shown in SEQ ID NO: 10) and a primer (pBYR2HS-CEGFP-R, base sequence is shown in SEQ ID NO: 11). The EGFP gene fragment was then introduced into the pBYR2HS vector cut by the restriction enzyme SalI to obtain the pBYR2HS-CEGFP vector.

Production of pBYR2HS-PLP-GFP Vector

The *Arabidopsis* putative membrane lipoprotein (hereinafter, also referred to as "PLP") gene fragment was then PCR amplified by using a primer (ADH-PLP-F, base sequence is shown in SEQ ID NO: 12) and a primer (PLP-GFP-R, base sequence is shown in SEQ ID NO: 13). The PLP gene fragment was then introduced into the pBYR2HS-CEGFP vector cut by the restriction enzyme SalI to obtain the pBYR2HS-PLP-GFP vector that expresses a fusion protein of PLP and GFP.

Production of pBYR2HS-Cryj1 Vector

A gene fragment (base sequence is shown in SEQ ID NO: 14) encoding a Cryj1 protein (hereinafter, also referred to as "Cryj1"), which is a cedar pollen allergen protein, was chemically synthesized (Thermo Fisher Scientific Co., Ltd.). Then, while the chemically synthesized gene fragment was used as a template, the gene fragment encoding the Cryj1 protein, which is a cedar pollen allergen, was PCR amplified by using a primer (pBYR2HS-Cryj1Nt-F, base sequence is shown in SEQ ID NO: 15) and a primer (pBYR2HS-Cryj1Nt-R, base sequence is shown in SEQ ID NO: 16). The Cryj1 gene fragment was then introduced into the pBYR2HS vector cut by the restriction enzyme SalI to obtain the pBYR2HS-Cryj1 vector.

Growth Conditions of Plant and Agroinfiltration

*Nicotiana benthamiana* was grown for 5 to 6 weeks under conditions of 25° C. and 16 hours in light and 8 hours in the dark. Each of the above-described vectors was introduced into an *Agrobacterium tumefaciens* GV3101 strain having a binary vector, and it was cultured at 28° C. until the stationary phase in L broth medium supplemented with 20 μM acetosyringone, 50 mg/L kanamycin, 30 mg/L gentamicin, and 30 mg/L rifampicin at 10 mM MES (pH 5.6).

Then, the culture solution was centrifuged to recover the *Agrobacterium tumefaciens*, and then suspended such that $OD_{600}$ was approximately 1 by using an infiltration buffer (10 mM magnesium chloride, 10 mM MES, (pH 5.6), and 100 μM acetosyringone). The *Agrobacterium tumefaciens* was then left in this liquid for 2 to 3 hours.

After this, the suspension of *Agrobacterium tumefaciens* was infiltrated on the underside of the leaves of *Nicotiana benthamiana* by using a 1 mL syringe without a needle. Alternatively, in some cases, *Nicotiana benthamiana* was immersed in the *Agrobacterium* suspension (agroinfiltration liquid), and vacuum infiltrated by leaving it under a pressure of 736 mmHg for 5 minutes, and then bringing the pressure back to atmospheric pressure.

In some experiments, an aqueous solution of sodium ascorbate or an aqueous solution of sodium citrate at each concentration was sprayed onto the leaves of the plant once every two days. In addition, in some experiments, sodium ascorbate was added to the infiltration buffer. Expression induction of heat shock protein was performed by incubating the plant for 1 hour at 37° C. one day and three days after the infiltration. In the following Example, sodium L-ascorbate was used as sodium ascorbate.

Example 1

Spray 1 of Ascorbic Acid

Agroinfiltration using a syringe was performed to express GFP, hCu1, hFbxw7, PLP-GFP, and Cryj1 in the leaves of *Nicotiana benthamiana*. In the expression of PLP-GFP, a 1/100 amount of pBYR2HS-EGFP was simultaneously agroinfitrated. Each plant was cultured at 18° C. for seven days after agroinfiltration. In addition, 0, 30, 50, 100, 200, and 300 mM aqueous solutions of sodium ascorbate were sprayed once every two days.

Figure 2:
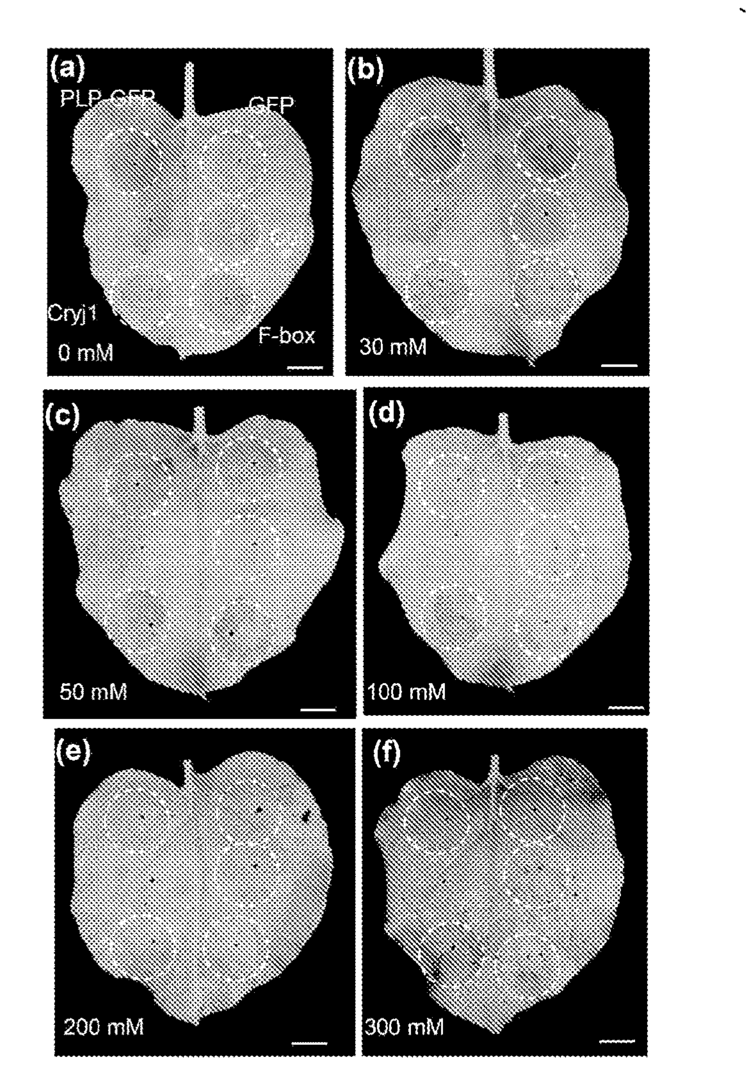
FIG. 2 shows representative photographs of leaves of each plant photographed in Example 1.

FIG. 2 shows representative photographs obtained by photographing leaves of each plant seven days after agroinfiltration. The scale bar indicates 1 cm. In this figure, (a) shows the results of not spraying an aqueous solution of sodium ascorbate, (b) shows the results of spraying a 30 mM aqueous solution of sodium ascorbate, (c) shows the results of spraying a 50 mM aqueous solution of sodium ascorbate, (d) shows the results of spraying a 100 mM aqueous solution of sodium ascorbate, (e) shows the results of spraying a 200 mM aqueous solution of sodium ascorbate, and (f) shows the results of spraying a 300 mM aqueous solution of sodium ascorbate. In (a) to (f), the region surrounded by the dotted circle is a region expressing GFP, hCu1, hFbxw7, PLP-GFP, and Cryj1, respectively.

As a result, it was observed that, in the region that had expressed hCu1, hFbxw7, PLP-GFP, and Cryj1 in particular, the leaves became black, and it was revealed that cell death (gangrene) was induced by transient protein expression. It was also revealed that gangrene was inhibited when sprayed with 100, 200, and 300 mM aqueous solutions of sodium ascorbate.

Measurement of GFP Protein Expression Level

The soluble protein was then extracted from the region where the GFP protein was expressed in the leaves of each plant. The prepared soluble protein was subjected to SDS-polyacrylamide gel electrophoresis (SDS-PAGE) and then detected by Coomassie Brilliant Blue (CBB) staining. For comparison, 100 ng, 200 ng, and 400 ng of purified GFP proteins were also subjected to SDS-PAGE and CBB staining.

Figure 3A:
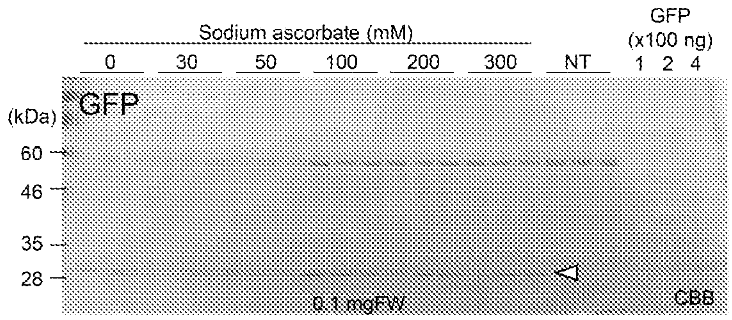
FIG. 3A is a photograph showing the results of Coomassie Brilliant Blue (CBB) staining in Example 1.
Figure 3B:
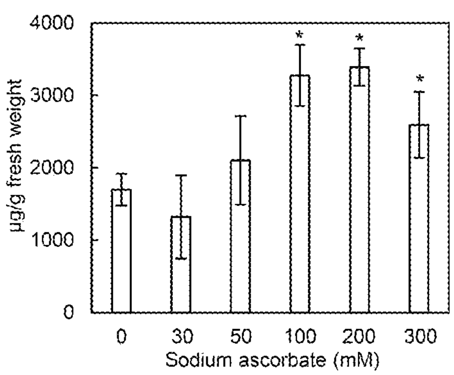
FIG. 3B is a graph showing the results of an expression level quantification of a GFP protein based on FIG. 3A.

FIG. 3A is a photograph showing the results of CBB staining. In FIG. 3A, "NT" indicates the results of the leaves of *Nicotiana benthamiana* without gene introduction, and "FW" indicates fresh weight. In FIG. 3A, the band in the vicinity of 30 kDa indicated by the arrowhead is a band of the GFP protein, and the band in the vicinity of 50 kDa is a band of the Rubisco large subunit. FIG. 3B is a graph showing the results of quantifying the expression level of the GFP protein based on FIG. 3A. In FIG. 3B, "*" indicates that there is a significant difference at $p<0.05$ by the Student's T-test.

As a result, an increase in expression level of the GFP protein was observed in the sample sprayed with the aqueous solution of sodium ascorbate having a concentration of 100 mM or higher. In addition, an increase in expression level of the Rubisco large subunit was also observed in the sample sprayed with the aqueous solution of sodium ascorbate having a concentration of 100 mM or higher. From these results, it was revealed that the spray of the aqueous solution of sodium ascorbate reduced gangrene of the plant and increased production of the target protein.

Measurement of hCu1 Protein Expression Level

The soluble protein was then extracted from the region where the hCu1 protein was expressed in the leaves of each plant. The prepared soluble protein was then subjected to SDS-PAGE and transferred to a PVDF membrane. As described above, a FLAG tag was attached to the N-terminus of the hCu1 protein. Here, the hCu1 protein was detected by Western blotting with an anti-FLAG antibody.

Figure 4A:
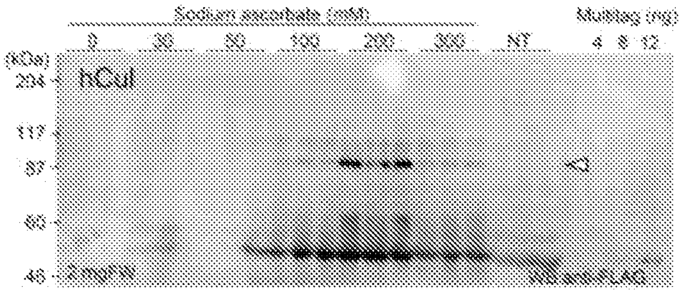
FIG. 4A is a photograph showing the results of Western blotting for human Cullin 1 (hCu1) protein detection in Example 1.
Figure 4B:
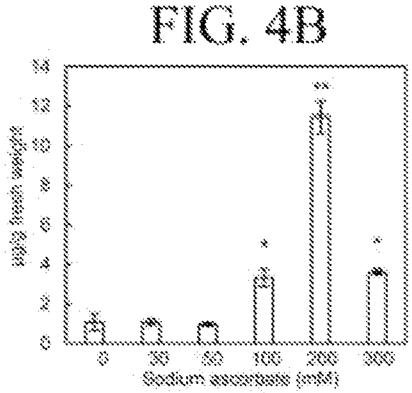
FIG. 4B is a graph showing the results of an expression level quantification of the hCu1 protein based on FIG. 4A.

FIG. 4A is a photograph showing the results of Western blotting. In FIG. 4A, "NT" indicates the results of the leaves of *Nicotiana benthamiana* without gene introduction, and "FW" indicates fresh weight. In FIG. 4A, the band indicated by the arrowhead indicates the band of the hCu1 protein. FIG. 4B is a graph showing the results of quantifying the expression level of the hCu1 protein based on FIG. 4A. In FIG. 4B, "*" indicates that there is a significant difference at $p<0.05$ by the Student's T-test, and "**" indicates that there is a significant difference at $p<0.01$ by the Student's T-test.

As a result, an increase in expression level of the hCu1 protein was observed in the sample sprayed with the aqueous solution of sodium ascorbate having a concentration of 100 mM or higher. In addition, a peak in the expression level of the hCu1 protein was observed in the sample sprayed with the aqueous solution of sodium ascorbate having a concentration of 200 mM or higher. These results further support that the spray of the aqueous solution of sodium ascorbate reduced gangrene of the plant and increased the production of the target protein.

Measurement of PLP-GFP Protein Expression Level

The soluble protein was then extracted from the region where the PLP-GFP protein was expressed in the leaves of each plant. The prepared soluble protein was then subjected to SDS-PAGE and transferred to a PVDF membrane. For comparison, 100 ng, 200 ng, and 300 ng of purified GFP proteins were also subjected to SDS-PAGE and transferred to a PVDF membrane. Then, the PLP-GFP protein was detected by Western blotting with an anti-GFP antibody.

Figure 5A:
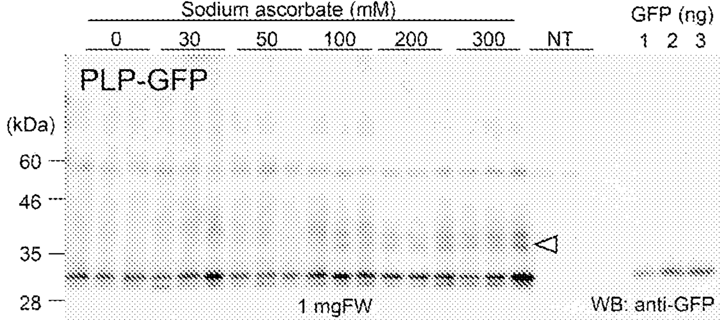
FIG. 5A is a photograph showing the results of Western blotting for detection of a fusion protein (PLP-GFP protein) of *Arabidopsis* putative membrane lipoprotein (PLP) and GFP in Example 1.

FIG. 5A is a photograph showing the results of Western blotting. In FIG. 5A, "NT" indicates the results of the leaves of *Nicotiana benthamiana* without gene introduction, and "FW" indicates fresh weight. In FIG. 5A, the band indicated by the arrowhead indicates the band of the PLP-GFP protein. In addition, the band near 30 kDa is the band of the GFP protein.

As described above, in the expression of PLP-GFP, a 1/100 amount of pBYR2HS-EGFP was simultaneously agroinfitrated, and thus, the GFP protein was detected.

Figure 5B:
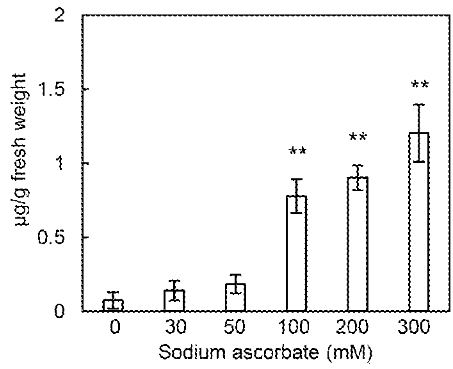
FIG. 5B is a graph showing the results of an expression level quantification of the PLP-GFP protein based on FIG. 5A.

FIG. 5B is a graph showing the results of quantifying an expression level of the PLP-GFP protein based on FIG. 5A. In FIG. 5B, "**" indicates that there is a significant difference at $p<0.01$ by the Student's T-test.

As a result, an increase in expression level of the PLP-GFP protein was observed in the sample sprayed with the aqueous solution of sodium ascorbate having a concentration of 100 mM or higher. This result further supports that the spray of the aqueous solution of sodium ascorbate reduced gangrene of the plant and increased the production of the target protein.

Example 2

Spray 2 of Ascorbic Acid

Agroinfiltration using a syringe was performed to express each of GFP, hCu1, and hFbxw7 in the leaves of *Nicotiana benthamiana*. Each plant was cultured at 25° C. for seven days after agroinfiltration. In addition, a 0 or 200 mM aqueous solution of sodium ascorbate was sprayed once every two days. The present Example was mainly different from Example 1 in the growth temperatures of the plant.

Figure 6:
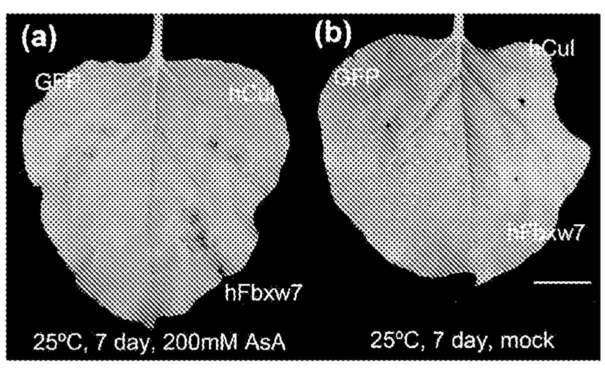
FIG. 6 shows photographs obtained by photographing leaves of each plant in Example 2, and shows the results of spraying an aqueous solution of sodium ascorbate (see (a)), and the results of not spraying an aqueous solution of sodium ascorbate (see (b)).

FIG. 6 shows photographs obtained by photographing the leaves of each plant seven days after agroinfiltration. The scale bar indicates 1 cm. In this figure, (a) shows the results of spraying a 200 mM aqueous solution of sodium ascorbate, and (b) shows the results (contrast, Mock) of not spraying an aqueous solution of sodium ascorbate.

As a result, a tendency of gangrene suppression was observed when the aqueous solution of sodium ascorbate was sprayed.

Measurement of GFP Protein Expression Level

The soluble protein was extracted from the region where the GFP protein was expressed in the leaves of each plant three days, five days, and seven days after agroinfiltration. The prepared soluble protein was then subjected to SDS-PAGE and detected by CBB staining.

Figure 7A:
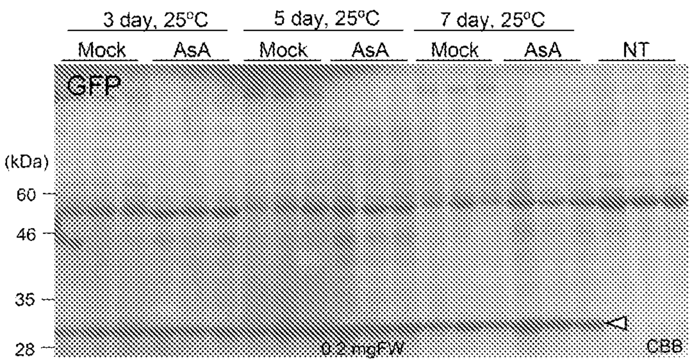
FIG. 7A is a photograph showing the results of CBB staining in Example 2.

FIG. 7A is a photograph showing the results of CBB staining. In FIG. 7A, "NT" indicates the results of the leaves of *Nicotiana benthamiana* without gene introduction, and "FW" indicates fresh weight. In addition, "Mock" indicates the results of not spraying an aqueous solution of sodium ascorbate, and "AsA" indicates the result of spraying a 200 mM aqueous solution of sodium ascorbate.

Figure 7B:
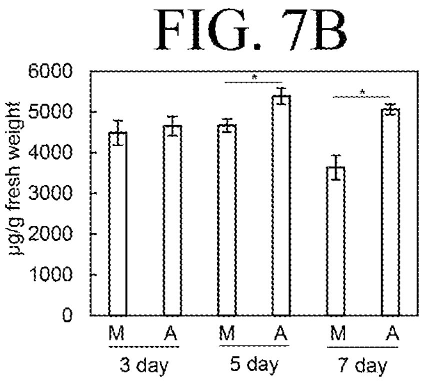
FIG. 7B is a graph showing the results of an expression level quantification of a GFP protein based on FIG. 7A.

In FIG. 7A, the band in the vicinity of 30 kDa indicated by the arrowhead is a band of the GFP protein, and the band in the vicinity of 50 kDa is a band of the Rubisco large subunit. FIG. 7B is a graph showing the results of quantifying the expression level of the GFP protein based on FIG. 7A. In FIG. 7B, "M" indicates the results of not spraying an aqueous solution of sodium ascorbate, and "A" indicates the results of spraying a 200 mM aqueous solution of sodium ascorbate. In addition, "*" indicates that there is a significant difference at $p<0.05$ by the Student's T-test.

Although the GFP proteins were somewhat stable, a tendency of gangrene development was observed when culturing was continued for seven days after agroinfiltration. In contrast, by spraying a 200 mM aqueous solution of sodium ascorbate, a tendency of gangrene reduction and of GFP protein expression level sustenance was observed. These results further supports that the spray of the aqueous solution of sodium ascorbate reduced gangrene of the plant and increased the production of the target protein.

Measurement of hCu1 Protein Expression Level

The soluble protein was extracted from the region where the hCu1 protein was expressed in the leaves of each plant three days, five days, and seven days after agroinfiltration. The prepared soluble protein was then subjected to SDS-PAGE and transferred to a PVDF membrane. As described above, a FLAG tag was attached to the N-terminus of the hCu1 protein. Here, the hCu1 protein was detected by Western blotting with an anti-FLAG antibody.

Figure 8A:
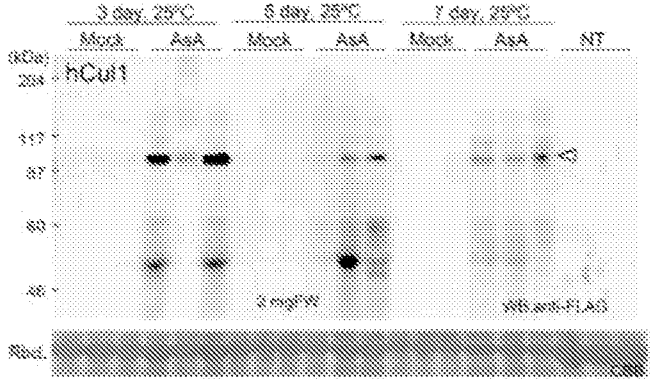
FIG. 8A is a photograph showing the results of Western blotting for hCu1 protein detection in Example 2.

FIG. 8A is a photograph showing the results of Western blotting. FIG. 8A also illustrates the result of CBB staining. In FIG. 8A, "NT" indicates the results of the leaves of *Nicotiana benthamiana* without gene introduction, and "FW" indicates fresh weight. In addition, "Mock" indicates the result of not spraying an aqueous solution of sodium ascorbate, and "AsA" indicates the result of spraying a 200 mM aqueous solution of sodium ascorbate. In addition, the band indicated by the arrowhead indicates the band of the hCu1 protein. In addition, "RbcL" indicates the Rubisco large subunit.

Figure 8B:
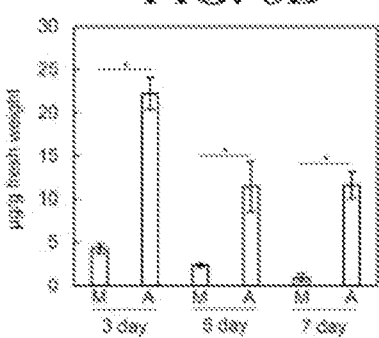
FIG. 8B is a graph showing the results of an expression level quantification of the hCu1 protein based on FIG. 8A.

FIG. 8B is a graph showing the results of quantifying the expression level of the hCu1 protein based on FIG. 8A. In FIG. 8B, "M" indicates the results of not spraying an aqueous solution of sodium ascorbate, and "A" indicates the results of spraying a 200 mM aqueous solution of sodium ascorbate. In addition, "*" indicates that there is a significant difference at $p<0.05$ by the Student's T-test.

As a result, almost no expression of the hCu1 protein was observed in the sample that was not sprayed with the aqueous solution of sodium ascorbate. On the other hand, in the sample sprayed with a 200 mM aqueous solution of sodium ascorbate, a peak in the expression level of the hCu1 protein was observed three days after agroinfiltration, and the expression of the hCu1 protein was maintained even seven days after agroinfiltration.

These results further supports that the spray of the aqueous solution of sodium ascorbate reduced gangrene of the plant and increased the production of the target protein.

Measurement of hFbxw7 Protein Expression Level

The soluble protein was extracted from the region where the hFbxw7 protein was expressed in the leaves of each plant three days after agroinfiltration. The prepared soluble protein was then subjected to SDS-PAGE and transferred to a PVDF membrane. As described above, a FLAG tag was attached to the N-terminus of the hFbxw7 protein. Here, the hFbxw7 protein was detected by Western blotting with an anti-FLAG antibody.

Figure 9:
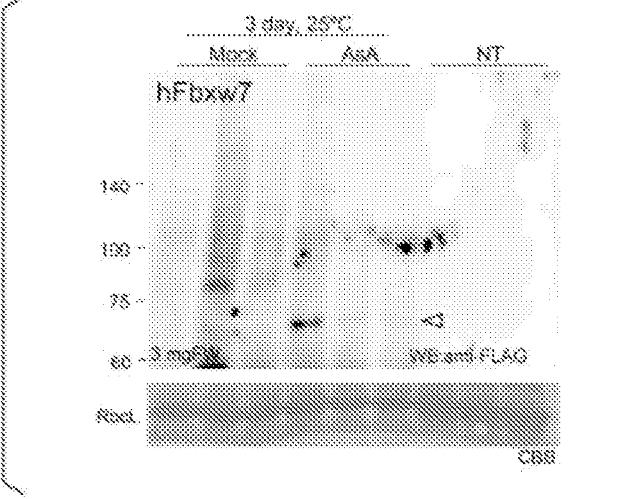
FIG. 9 is a photograph showing the results of Western blotting for detection of a human F-box protein, that is, an Fbxw7 (hFbxw7) protein in Example 2.

FIG. 9 is a photograph showing the results of Western blotting. FIG. 9 also illustrates the results of CBB staining. In FIG. 9, "NT" indicates the results of the leaves of *Nicotiana benthamiana* without gene introduction, and "FW" indicates fresh weight. In addition, "Mock" indicates the result of not spraying an aqueous solution of sodium ascorbate, and "AsA" indicates the result of spraying a 200 mM aqueous solution of sodium ascorbate. In addition, the band indicated by the arrowhead indicates the band of the hFbxw7 protein. In addition, "RbcL" indicates the Rubisco large subunit.

As a result, almost no expression of the hFbxw7 protein was observed in the sample that was not sprayed with the aqueous solution of sodium ascorbate. In contrast, in the sample sprayed with a 200 mM aqueous solution of sodium ascorbate, the expression of the hFbxw7 protein was observed three days after agroinfiltration. These results further support that the spray of the aqueous solution of sodium ascorbate reduced gangrene of the plant and increased the production of the target protein.

Example 3

Addition 1 of Ascorbic Acid to Agroinfiltration Liquid

Sodium ascorbate was added to the agroinfiltration liquid to examine whether gangrene can be inhibited. Specifically, *Nicotiana benthamiana* was immersed in the agroinfiltration liquid, and vacuum infiltrated by leaving it under a pressure of 736 mmHg for 5 minutes, and then bringing the pressure back to atmospheric pressure, and thus the hCu1 protein was expressed. Here, sodium ascorbate having a final concentration of 80 mM, 100 mM, or 200 mM was added to the agroinfiltration liquid. Each plant was cultured at 25° C. for seven days after agroinfiltration.

Figure 10:
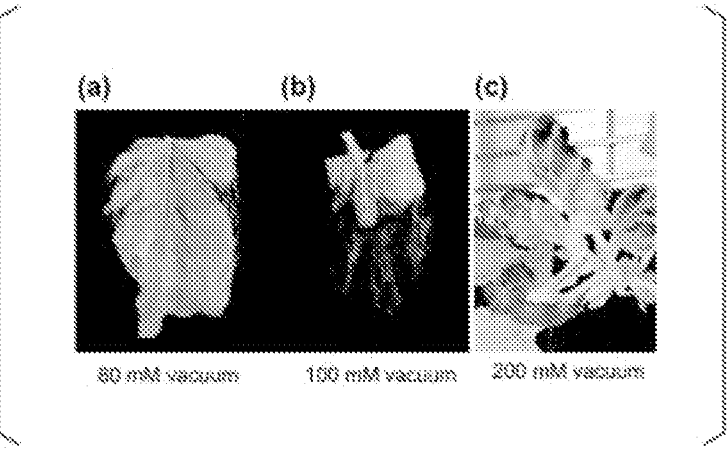
FIG. 10 shows representative photographs obtained by photographing leaves of each plant in Example 3.

FIG. 10 shows representative photographs obtained by photographing the leaves of each plant seven days after agroinfiltration. In this figure, (a) shows the results of adding 80 mM sodium ascorbate to the agroinfiltration liquid, (b) shows the results of adding 100 mM sodium ascorbate to the agroinfiltration liquid, and (c) shows the results of adding 200 mM sodium ascorbate to the agroinfiltration liquid. In (a) to (c), "vacuum" indicates the results of vacuum infiltration.

As a result, it was revealed that, when the sodium ascorbate having a concentration of 80 mM or higher was added to the agroinfiltration liquid, the gangrene possibly caused by osmotic stress was induced.

Example 4

Addition 2 of Ascorbic Acid to Agroinfiltration Liquid

Sodium ascorbate was added to the agroinfiltration liquid to examine whether gangrene can be inhibited. Specifically, *Nicotiana benthamiana* was immersed in the agroinfiltration liquid, and vacuum infiltrated by leaving it under a pressure of 736 mmHg for 5 minutes, and then bringing the pressure back to atmospheric pressure, and thus the hCu1 protein was expressed. Here, sodium ascorbate having a final concentration of 0, 10, 20, 30, or 40 mM was added to the agroinfiltration liquid.

Sodium ascorbate was administered only once at the time of agroinfiltration. In addition, for comparison, a sample that was sprayed once every two days with a 200 mM aqueous solution of sodium ascorbate, with no sodium ascorbate being added to the agroinfiltration liquid, was also prepared. Each plant was cultured at 25° C. for seven days after agroinfiltration.

Figure 11:
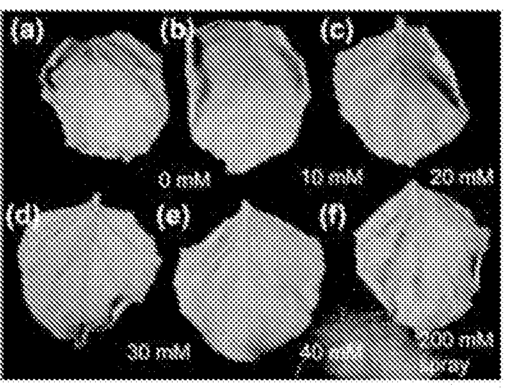
FIG. 11 shows representative photographs obtained by photographing leaves of each plant in Example 4.

FIG. 11 shows representative photographs obtained by photographing the leaves of each plant seven days after agroinfiltration. In this figure, (a) shows the results of adding no sodium ascorbate to the agroinfiltration liquid, (b) shows the results of adding sodium ascorbate having a final concentration of 10 mM to the agroinfiltration liquid, (c) shows the results of adding sodium ascorbate having a final concentration of 20 mM to the agroinfiltration liquid, (d) shows the results of adding sodium ascorbic acid having a final concentration of 30 mM to the agroinfiltration liquid, (e) shows the results of adding sodium ascorbate having a final concentration of 40 mM to the agroinfiltration liquid, and (f) shows the results of spraying a 200 mM aqueous solution of sodium ascorbate once every two days with no sodium ascorbate being added to the agroinfiltration liquid.

In addition, FIG. 12 shows representative photographs obtained by photographing each of the plants seven days after agroinfiltration. In this figure, (a) shows the results of adding no sodium ascorbate to the agroinfiltration liquid, (b) shows the results of adding sodium ascorbate having a final concentration of 10 mM to the agroinfiltration liquid, (c) shows the results of adding sodium ascorbate having a final concentration of 20 mM to the agroinfiltration liquid, (d) shows the results of adding sodium ascorbate having a final concentration of 30 mM to the agroinfiltration liquid, (e) shows the results of adding sodium ascorbate having a final concentration of 40 mM to the agroinfiltration liquid, and (f)

shows the results of spraying a 200 mM aqueous solution of sodium ascorbate once every two days with no sodium ascorbate being added to the agroinfiltration liquid.

The soluble protein was then extracted from the leaves of each plant seven days after agroinfiltration. The prepared soluble protein was then subjected to SDS-PAGE and transferred to a PVDF membrane. As described above, a FLAG tag was attached to the N-terminus of the hCu1 protein. Here, the hCu1 protein was detected by Western blotting with an anti-FLAG antibody.

FIG. 13A is a photograph showing the results of Western blotting, and also illustrates the results of CBB staining. In FIG. 13A, "NT" indicates the results of the leaves of *Nicotiana benthamiana* without gene introduction, and "FW" indicates fresh weight. In addition, "vacuum" indicates the result of performing the vacuum infiltration, and "spray" indicates the result of spraying an aqueous solution of sodium ascorbate without adding sodium ascorbate to the agroinfiltration liquid. In addition, the band indicated by the arrowhead indicates the band of the hCu1 protein. In addition, "RbcL" indicates the Rubisco large subunit.

FIG. 13B is a graph showing the results of quantifying the expression level of the hCu1 protein based on FIG. 13A. In FIG. 13B, "vacuum" and "spray" indicate the same meaning as those in FIG. 13A.

As a result, in a case where sodium ascorbate having a final concentration of 40 mM was added to the agroinfiltration liquid and vacuum infiltration was performed, the expression of the hCu1 protein similar to a case where a 200 mM aqueous solution of sodium ascorbate was sprayed once every two days with no sodium ascorbate being added to the agroinfiltration liquid, was observed.

The results show that the addition of sodium ascorbate to the agroinfiltration liquid can also reduce gangrene of the plant and increase the production of the target protein.

Example 5

Sodium Citrate Spray

The aqueous solution of sodium citrate was sprayed instead of the aqueous solution of sodium ascorbate, and whether gangrene of the plant could be reduced was examined Specifically, agroinfiltration using a syringe was performed to express GFP, hCu1, hFbxw7, and PLP-GFP protein in the leaves of *Nicotiana benthamiana*. Each plant was cultured at 18° C. for seven days after agroinfiltration. In addition, 0, 30, 50, 100, 200, and 300 mM aqueous solutions of sodium citrate were sprayed once every two days.

FIG. 14 shows photographs obtained by photographing the leaves of each plant seven days after agroinfiltration. The scale bar indicates 1 cm. In this figure, (a) shows the results of not spraying an aqueous solution of sodium citrate, (b) shows the results of spraying a 30 mM aqueous solution of sodium citrate, (c) shows the results of spraying a 50 mM aqueous solution of sodium citrate, (d) shows the results of spraying a 100 mM aqueous solution of sodium citrate, (e) shows the results of spraying a 200 mM aqueous solution of sodium citrate, and (f) shows the results of spraying a 300 mM aqueous solution of sodium citrate.

As a result, it was revealed that the leaves were in a wilted state when the aqueous solution of sodium citrate having a concentration of 100 mM or higher was sprayed.

The soluble protein was then extracted from the region where the GFP protein was expressed in the leaves of each plant. The prepared soluble proteins were then subjected to SDS-PAGE and detected by CBB staining.

FIG. 15A is a photograph showing the results of CBB staining. In FIG. 15A, "NT" indicates the results of the leaves of *Nicotiana benthamiana* without gene introduction, and "FW" indicates fresh weight. In FIG. 15A, the lower band is a band of approximately 30 kDa of GFP protein and the upper band is a band of approximately 50 kDa of the Rubisco large subunit. FIG. 15B is a graph showing the results of an expression level quantification of the GFP protein based on FIG. 15A.

As a result, it was revealed that the expression level of the GFP protein decreased when the aqueous solution of sodium citrate was sprayed, while it was observed that the expression level of the GFP protein increased when the aqueous solution of sodium ascorbate was sprayed. The results show that the administration of sodium citrate to a plant cannot inhibit cell death induced by transient protein expression.

Example 6

Relief 1 of Endoplasmic Reticulum Stress

The endoplasmic reticulum stress inhibitor was sprayed instead of the aqueous solution of sodium ascorbate, and whether gangrene of the plant could be reduced was examined. As the endoplasmic reticulum stress inhibitor, 4-phenylbutyrate (4-PBA), taurine-bound ursodeoxycholic acid (TUDCA), and trimethylamine-N-oxide (TMAO) were used.

Specifically, *Nicotiana benthamiana* was immersed in the agroinfiltration liquid, and vacuum infiltrated by leaving it under a pressure of 736 mmHg for 5 minutes, and then bringing the pressure back to atmospheric pressure, and thus the hFbxw7 protein was expressed. Each plant was cultured at 20° C. for seven days after agroinfiltration. In addition, 1 mM of each endoplasmic reticulum stress inhibitor was sprayed one day and three days after agroinfiltration.

Figure 16:
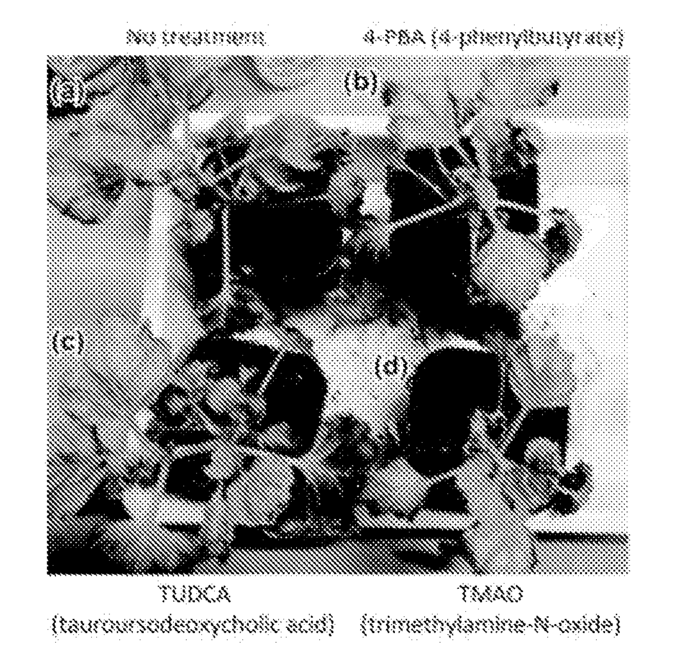
FIG. 16 shows representative photographs obtained by photographing each plant in Example 6.

FIG. 16 shows photographs obtained by photographing each plant seven days after agroinfiltration. In this figure, (a) shows the results of not spraying endoplasmic reticulum stress inhibitor, (b) shows the results of spraying 1 mM 4-PBA, (c) shows the results of spraying 1 mM TUDCA, and (d) shows the results of spraying 1 mM TMAO.

As a result, it was revealed that, even when the endoplasmic reticulum stress inhibitor was sprayed, cell death induced by transient protein expression cannot be inhibited.

Example 7

Relief 2 of Endoplasmic Reticulum Stress

By relieving the endoplasmic reticulum stress by inducing the expression of heat shock proteins, whether gangrene of the plant could be reduced was examined. Specifically, *Nicotiana benthamiana* was immersed in the agroinfiltration liquid, and vacuum infiltrated by leaving it under a pressure of 736 mmHg for 5 minutes, and then bringing the pressure back to atmospheric pressure, and thus the hFbxw7 protein was expressed. Each plant was cultured at 20° C. for seven days after agroinfiltration. In addition, one day after agroinfiltration, the plant was incubated at 37° C. for 1 hour to induce the expression of heat shock proteins.

Figure 17:
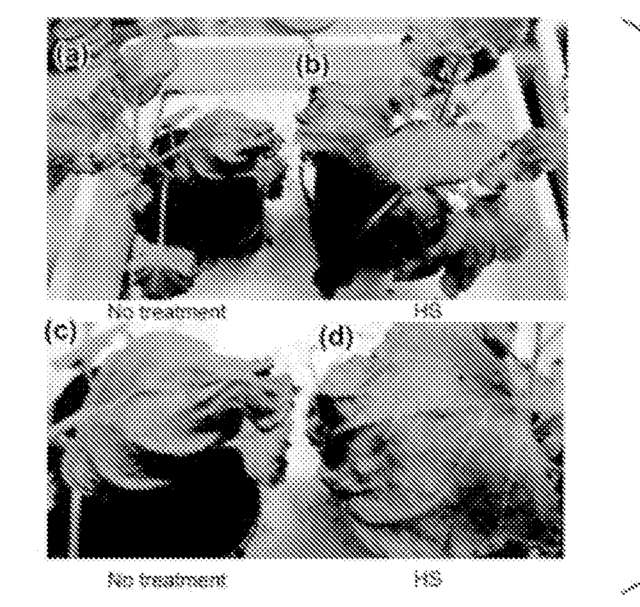
FIG. 17 shows representative photographs obtained by photographing each plant in Example 7. In this figure, (b) is a partially magnified photograph of (a), and (d) is a partially magnified photograph of (c).

FIG. 17 shows representative photographs obtained by photographing each plant seven days after agroinfiltration. In this figure, (a) is the result of not inducing the expression of heat shock proteins, and (b) is a partially magnified photograph of (a). In addition, (c) is the result of inducing the expression of heat shock proteins, and (d) is a partially magnified photograph of (c). In (c) and (d), "HS" indicates that the expression of heat shock proteins was induced.

As a result, it was revealed that, even when the endoplasmic reticulum stress inhibitor was sprayed, cell death induced by transient protein expression cannot be inhibited.

Example 8

Spray 3 of Ascorbic Acid

*Nicotiana benthamiana* was immersed in the agroinfiltration liquid, and vacuum infiltrated by leaving it under a pressure of 736 mmHg for 5 minutes, and then by bringing the pressure back to atmospheric pressure, and thus the Cryj1 protein was expressed. Each plant was cultured at 24° C. or 20° C. for seven days after agroinfiltration. In addition, a 0 mM or 200 mM aqueous solution of sodium ascorbate was sprayed once every two days.

Figure 18A:
FIG. 18A is a representative photograph obtained by photographing plants that have not been sprayed with an aqueous solution of sodium ascorbate in Example 8.

FIG. 18A is a representative photograph of a plant that was not sprayed with the aqueous solution of sodium ascorbate four days after agroinfiltration. As shown in FIG. 18A, when the aqueous solution of sodium ascorbate was not sprayed, gangrene was observed.

The soluble protein was then extracted from the leaves of each plant seven days after agroinfiltration. The prepared soluble protein was then subjected to SDS-PAGE and transferred to a PVDF membrane. Then, the Cryj1 protein was detected by Western blotting with an anti-Cryj1 antibody.

Figure 18B:
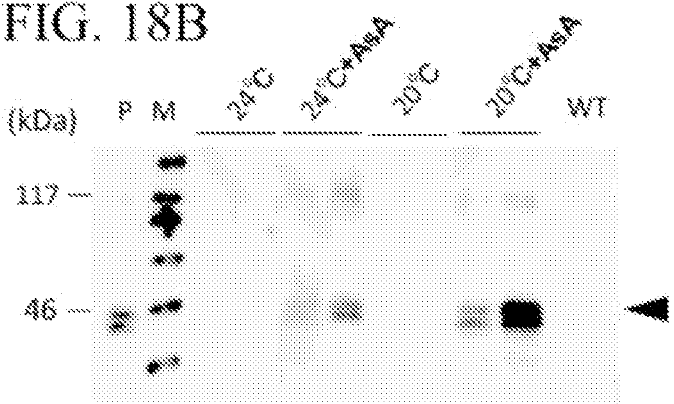
FIG. 18B is a photograph showing the results of Western blotting for Cryj1 protein detection in Example 8.

FIG. 18A is a photograph showing the results of Western blotting. In FIG. 18B, "P" indicates the result of SDS-PAGE and Western blotting of the Cryj1 protein derived from a natural product as a positive control, "M" indicates a molecular weight marker, "WT" indicates the result of the leaves of *Nicotiana benthamiana* without gene introduction, "24° C." indicates the result of culturing at 24° C., "20° C." indicates the result of culturing at 20° C., and "+AsA" indicates the result of spraying a 200 mM aqueous solution of sodium ascorbate once every two days.

As a result, expression of the Cryj1 protein was not observed when the aqueous solution of sodium ascorbate was not sprayed in any case of being cultured at 24° C. and 20° C. Meanwhile, when the aqueous solution of sodium ascorbate was sprayed, the expression of Cryj1 protein was observed.

In addition, two bands were observed in the same manner as the Cryj1 protein derived from the natural product. Of the two bands, the band having the higher molecular weight was the band of the Cryj1 protein to which the sugar chain was bound. In other words, it was confirmed that a sugar chain was also added to the Cryj1 protein expressed in *Nicotiana benthamiana.*

INDUSTRIAL APPLICABILITY

According to the present invention, a technique for inhibiting cell death induced by transient protein expression in a plant can be provided.

The invention claimed is:

1. A method for inhibiting cell death induced by transient protein expression in a plant of the genus Nicotiana, the method comprising the step of:

administering ascorbic acid, a salt thereof, or a solvate thereof to the plant of the genus Nicotiana, in which a target protein is transiently expressed, wherein a solution or a suspension of an initial concentration from 100 to 300 mM of the ascorbic acid, the salt thereof, or the solvate thereof is brought into contact with the plant of the genus Nicotiana.

2. The method according to claim 1, wherein in the administering step, the solution or the suspension is sprayed to the plant of the genus Nicotiana.

3. A method for inhibiting cell death in a plant of the genus Nicotiana, the method comprising the step of:

administering ascorbic acid, a salt thereof, or a solvate thereof to the plant of the genus Nicotiana in which a target protein is transiently expressed, wherein p1 the ascorbic acid, a salt thereof, or a solvate thereof is added to an Agrobacterium suspension for introducing an expression vector of the target protein to be administered to the plant of the genus Nicotiana, or to a culture solution for hydrocultivating the plant of the genus Nicotiana, and the ascorbic acid, the salt thereof, or the solvate thereof is brought into contact with the plant of the genus Nicotiana at a final concentration of 25 to 80 mM.

* * * * *

SEQUENCE LISTING

```
<160> NUMBER OF SEQ ID NOS: 16

<210> SEQ ID NO 1
<211> LENGTH: 38
<212> TYPE: DNA
<213> ORGANISM: Artificial Sequence
<220> FEATURE:
<223> OTHER INFORMATION: Synthesized primer named pRI201-EGFP-F

<400> SEQUENCE: 1

cactgttgat acatatggtg agcaagggcg aggagctg                           38


<210> SEQ ID NO 2
<211> LENGTH: 45
<212> TYPE: DNA
<213> ORGANISM: Artificial Sequence
<220> FEATURE:
<223> OTHER INFORMATION: Synthesized primer named EGFP-pRI201-R

<400> SEQUENCE: 2

attcagaatt gtcgacttat ccggacttgt acagctcgtc catgc                   45


<210> SEQ ID NO 3
<211> LENGTH: 41
<212> TYPE: DNA
<213> ORGANISM: Artificial Sequence
<220> FEATURE:
<223> OTHER INFORMATION: Synthesized primer named pBYR2fp-AtADH-F

<400> SEQUENCE: 3

tggagaggac ctcgagtaca tcacaatcac acaaaactaa c                       41


<210> SEQ ID NO 4
<211> LENGTH: 41
<212> TYPE: DNA
<213> ORGANISM: Artificial Sequence
<220> FEATURE:
```

<223> OTHER INFORMATION: Synthesized primer named pBYR2fp-HSPter-R

<400> SEQUENCE: 4
ccggggatcc tctagaaatt ccttatcttt aatcatattc c 41

<210> SEQ ID NO 5
<211> LENGTH: 2009
<212> TYPE: DNA
<213> ORGANISM: Homo sapiens

<400> SEQUENCE: 5
gcgaggatct tatggatgag agcgtgctga agttctacac ccagcagtgg gaagattacc 60
ggttcagctc taaggtgctg aacggtattt gcgcctacct taataggcac tgggtcagac 120
gtgagtgtga tgagggtaga aagggcatct acgagatcta cagccttgct cttgtgactt 180
ggagggattg ccttttcagg ccgcttaaca agcaggttac caacgctgtg cttaagctga 240
tcgagaaaga gaggaacggc gagactatta acacccggct tatttctggt gtggtgcagt 300
cttacgttga gctgggtctt aacgaggatg acgcttttgc taagggtcct accttgaccg 360
tgtacaaaga gagcttcgag tctcagttcc tggctgatac tgagcggttc tacactaggg 420
aatctaccga gttcttgcag cagaatcctg tgaccgagta catgaagaag gctgaggcta 480
ggcttctcga ggaacagaga agagttcagg tgtaccttca cgagtctacc caggatgagc 540
ttgctagaaa gtgcgagcag gtcctgattg agaagcacct tgagattttc catactgagt 600
tccagaacct cctggacgct gataagaacg aggatctcgg taggatgtac aacctggtgt 660
ctaggattca ggatggtctg ggtgagctta agaagctgct tgagactcac atccacaacc 720
agggtcttgc tgctattgag aagtgtggtg aggctgctct gaacgaccct aagatgtacg 780
ttcagaccgt gctggacgtg cacaagaagt acaacgctct ggtcatgagc gccttcaaca 840
acgatgctgg tttcgtggct gctctcgata aggcttgtgg ccggttcatt aacaacaacg 900
ccgtgaccaa gatggcccag tcctcttcaa agtctcctga gcttcttgct cggtactgcg 960
attctctgct gaagaagtcc tctaagaacc ctgaggaagc tgagcttgag gataccctta 1020
accaggtcat ggtggtgttc aagtacatcg aggacaagga cgtgttccaa aagttctacg 1080
ctaagatgct ggccaagcgg cttgtgcatc aaaacagcgc ttcagatgat gccgaggcca 1140
gcatgatttc taagttgaag caggcttgcg gcttcgagta cacctctaag ttgcagagga 1200
tgttccagga catcggcgtg agcaaggatt tgaacgagca gttcaagaag cacttgacca 1260
acagcgagcc tctggatctg gacttctcta ttcaggtgct cagctctggt tcttggcctt 1320
tccaacagtc ttgtaccttc gctctgcctt ctgagttgga gaggtcttac cagaggttca 1380
ccgctttcta cgcttctagg cattctggca gaaagctgac ctggctttac cagctttcta 1440
agggtgagct ggtgaccaac tgcttcaaga acaggtacac ccttcaggcc tctaccttcc 1500
agatggctat tctccttcag tacaacaccg aggacgctta cactgtgcag cagcttactg 1560
atagcaccca gatcaagatg gacatcctgg ctcaggtgct gcagatcctt cttaagtcta 1620
agctcctggt gctcgaggac gagaacgcta atgttgatga ggttgagctg aagccggaca 1680
cactgattaa gctgtacctg ggctacaaga acaagaaact gcgggtgaac atcaacgtgc 1740
cgatgaagac tgaacagaag caagagcaag agactaccca caagaacatc gaagaggatc 1800
ggaagctgct gatccaggct gctatcgtta ggatcatgaa gatgcggaag gtcctgaagc 1860
accagcagtt gcttggtgag gttttgaccc agctgtcctc taggttcaag cctagggttc 1920
cagtgatcaa gaagtgcatc gacatcctca ttgagaaaga atacctcgag agagtcgacg 1980
gcgagaagga tacctattct tacctggct 2009

<210> SEQ ID NO 6
<211> LENGTH: 4
<212> TYPE: PRT
<213> ORGANISM: Homo sapiens

<400> SEQUENCE: 6

Lys Asp Glu Leu
1

<210> SEQ ID NO 7
<211> LENGTH: 40
<212> TYPE: DNA
<213> ORGANISM: Artificial Sequence
<220> FEATURE:
<223> OTHER INFORMATION: Synthesized primer named pBYR2HS-Hisx6-F

<400> SEQUENCE: 7
actgttgata gtcgacatgg tgagcaaggg cgaggagctg 40

<210> SEQ ID NO 8
<211> LENGTH: 25
<212> TYPE: DNA
<213> ORGANISM: Artificial Sequence
<220> FEATURE:
<223> OTHER INFORMATION: Synthesized primer named pBYR2HS-KDEL-R

<400> SEQUENCE: 8
attcagaatt gtcgacttac agctc 25

<210> SEQ ID NO 9
<211> LENGTH: 1758
<212> TYPE: DNA
<213> ORGANISM: Homo sapiens

<400> SEQUENCE: 9
agcgtgacct accttcctga gaagggactt tattgccagc ggttgccttc ttctaggact 60
catggtggta ctgagagcct gaagggtaag aacactgaga acatgggatt ctacggcacc 120
ctgaagatga tcttctacaa gatgaagcgg aagctggacc acggttctga ggtgagatct 180
ttcagccttg gtaagaagcc gtgcaaggtt agcgagtaca cttctactac tggtctggtg 240
ccttgctctg ctactcctac tactttcggt gatctgaggg ctgctaatgg tcaaggtcag 300
cagagaaggc ggattacttc tgttcaacct cctaccggac ttcaagagtg gctgaagatg 360
ttccagtctt ggtctggacc tgagaagctg cttgctcttg atgagctgat cgatagctgt 420
gagccgactc aggttaagca catgatgcag gttatcgagc ctcagttcca gcgggatttc 480
atctctttgc tgcctaaaga actggccctg tacgtgctgt ctttcttgga gcctaaggat 540
cttcttcagg ctgcacagac ttgcaggtat tggaggattc tggctgagga caacctgctt 600
tggcgtgaga agtgtaaaga agagggtatc gacgagccgc tgcacatcaa gagaagaaag 660
gttatcaagc cgggcttcat ccactctcca tggaagtctg cttacatcag gcagcacagg 720
atcgatacca attggagaag gggtgagctg aagtctccta aggtgttgaa gggccacgat 780
gaccatgtga ttacctgcct tcagttctgc ggtaacagga tcgtgagcgg ctctgatgat 840
aacaccctta aggtttggtc tgccgtgacc ggtaagtgcc ttagaactct tgttggtcat 900
accggtggcg tgtggtcatc tcagatgagg gataacatca tcatcagcgg ctctaccgat 960
aggaccttga aggtgtggaa tgctgagact ggtgagtgca ttcacaccct ttacggtcat 1020

```
acctctaccg tgagatgcat gcaccttcac gagaagagag tggtgtctgg ttctagggat   1080

gctaccctta gagtgtggga tatcgaaacc ggtcagtgct tgcatgtgct gatgggtcat   1140

gttgctgctg ttagatgcgt gcagtatgat ggtaggcgtg ttgtgtctgg cgcttacgat   1200

ttcatggtta aggtgtggga tcccgagaca gagacttgcc ttcatactct tcagggccac   1260

accaacaggg tgtactcact tcagttcgat ggtatccacg tggtgagcgg ttctctggat   1320

acctctatca gagtttggga cgtcgagact ggtaactgca tccatactct taccggccac   1380

cagtctttga cctctggtat ggaactcaag gacaacatcc tcgtgtccgg caatgctgat   1440

agcaccgtga agatctggga tattaagacc ggacagtgcc ttcagacact gcagggtcct   1500

aacaaacatc agtctgctgt gacctgcttg cagttcaaca agaacttcgt gatcaccagc   1560

tccgatgacg gaactgtgaa gctgtgggac cttaagactg gcgagttcat taggaacctg   1620

gtgactcttg agagcggtgg ttctggtggt gtggtttgga gaattagggc ctctaacacc   1680

aagcttgttt gcgctgttgg atctaggaac gggaccgaag agactaagct tctggtgctg   1740

gatttcgacg tggacatg                                                  1758
```

<210> SEQ ID NO 10
<211> LENGTH: 40
<212> TYPE: DNA
<213> ORGANISM: Artificial Sequence
<220> FEATURE:
<223> OTHER INFORMATION: Synthesized primer named pBYR2HS-CEGFP-F

<400> SEQUENCE: 10

```
actgttgata gtcgacatgg tgagcaaggg cgaggagctg                            40
```

<210> SEQ ID NO 11
<211> LENGTH: 38
<212> TYPE: DNA
<213> ORGANISM: Artificial Sequence
<220> FEATURE:
<223> OTHER INFORMATION: Synthesized primer named pBYR2HS-CEGFP-R

<400> SEQUENCE: 11

```
attcagaatt gtcgattatc cggacttgta cagctcgt                              38
```

<210> SEQ ID NO 12
<211> LENGTH: 40
<212> TYPE: DNA
<213> ORGANISM: Artificial Sequence
<220> FEATURE:
<223> OTHER INFORMATION: Synthesized primer named ADH-PLP-F

<400> SEQUENCE: 12

```
cactgttgat agtcgatggc agtatcaaag acaacaatgc                            40
```

<210> SEQ ID NO 13
<211> LENGTH: 41
<212> TYPE: DNA
<213> ORGANISM: Artificial Sequence
<220> FEATURE:
<223> OTHER INFORMATION: Synthesized primer named PLP-GFP-R

<400> SEQUENCE: 13

```
tgctcaccat gtcgacttta ggtgatggag ccacttcact g                          41
```

<210> SEQ ID NO 14
<211> LENGTH: 1125
<212> TYPE: DNA

-continued

```
<213> ORGANISM: Cryptomeria japonica

<400> SEQUENCE: 14

atggattcac cttgtcttgt tgcacttttg gtgtttagtt tcgttatagg tagttgtttc      60

agcgataatc caatcgatag ctgctggaga ggagattcca actgggctca aaataggatg     120

aagcttgctg attgcgcagt tggattcggt tcttcaacaa tgggaggaaa gggaggagat     180

ctttatactg tgacaaactc tgatgatgat cctgttaatc cagctcctgg aacattaaga     240

tacggtgcaa ctagagatag gcctctctgg ataatctttt caggaaacat gaatatcaag     300

cttaagatgc caatgtacat cgcaggatac aagacttttg atggaagagg tgctcaagtg     360

tatattggta acggaggtcc atgtgttttc attaaaaggg tttcaaacgt gataattcat     420

ggactttatt tgtacggttg ctcaacaagt gtgcttggaa acgttcttat taatgagtct     480

tttggtgttg agccagtgca tcctcaggat ggagatgctt taactctcag gactgcaaca     540

aatatctgga tagatcacaa cagcttctcc aatagtagcg atggtcttgt tgatgtgact     600

ttgacatcta ctggagtgac aatctcaaat aacttgtttt tcaaccatca caaggttatg     660

ctcctcggac atgatgatgc atattccgat gataagtcta tgaaagttac tgtggctttt     720

aaccaattcg gaccaaattg tggtcagaga atgcctagag ctagatacgg tttagttcac     780

gtggcaaata acaattacga tccatggaca atatacgcaa ttggaggttc ctctaatcct     840

acaattttgt cagaaggaaa cagttttact gctccaaatg agtcttataa gaagcaagtt     900

acaataagga tcggttgtaa gacttcaagt agctgcagta actgggtgtg gcaaagcaca     960

caggatgttt tctataatgg tgcttacttc gtttcctctg gtaaatatga aggtggaaac    1020

atctatacta agaaagaagc tttcaatgtt gagaacggta atgcaacacc tcagcttact    1080

aagaatgctg gagttttaac ttgttctctc tcaaaaagat gctaa                    1125


<210> SEQ ID NO 15
<211> LENGTH: 40
<212> TYPE: DNA
<213> ORGANISM: Artificial Sequence
<220> FEATURE:
<223> OTHER INFORMATION: Synthesized primer named pBYR2HS-Cryj1Nt-F

<400> SEQUENCE: 15

cactgttgat agtcgatgga ttcaccttgt cttgttgcac                            40


<210> SEQ ID NO 16
<211> LENGTH: 39
<212> TYPE: DNA
<213> ORGANISM: Artificial Sequence
<220> FEATURE:
<223> OTHER INFORMATION: Synthesized primer named pBYR2HS-Cryj1Nt-R

<400> SEQUENCE: 16

tgtagtccat gtcgacgcat ctttttgaga gagaacaag                             39
```